Sept. 14, 1965   R. W. MILLER   3,206,748
VEHICLE SPEED RECORDING APPARATUS
Filed Dec. 27, 1962

INVENTOR.
ROBERT WILLIAM MILLER
BY
W.B.Harpman
ATTORNEY

United States Patent Office 3,206,748
Patented Sept. 14, 1965

3,206,748
VEHICLE SPEED RECORDING APPARATUS
Robert William Miller, Box 288, Berwick, Pa.
Filed Dec. 27, 1962, Ser. No. 247,667
3 Claims. (Cl. 343—8)

This invention relates to apparatus for automatically detecting the speed of an approaching vehicle and photographing the vehicle along with indicia indicating speed, time and date so as to provide pictorial evidence of a traffic violation.

The principal object of the invention is the provision of a vehicle speed recording apparatus which may be and preferably is mounted in an enforcement vehicle and arranged to that it can be operated while said vehicle is in a stationary position as well as when said vehicle is moving.

A further object of the invention is the provision of a vehicle speed recording apparatus making use of the Doppler effect produced when an object travels relative to a radio signal source and commonly referred to as radar.

A still further object of the invention is the provision of a speed detecting and recording apparatus which incorporates a remote illuminating device for illuminating a vehicle in a predetermined area and corresponding with an area on which the recording apparatus is focused.

A still further object of the invention is the provision of a vehicle speed recording apparatus which utilizes a Doppler radar for determining the speed of the vehicle being monitored and automatically actuates a camera to expose film therein while simultaneously actuating the vehicle illuminating means and which apparatus also provides pertinent data so arranged as to be recorded on the same film as the photographic image of the vehicle being monitored.

This invention relates to a vehicle speed recording apparatus for automatically producing a photographic evidence of a traffic violation. The use of the Doppler effect produced when an object travels relative to a radio signal source has been applied to the measurement of the object speeds. A radio beam is directed from a fixed antenna along the path of the object, the signal reflected from the moving object is mixed with a sample of the transmitted signal, and the resulting Doppler beat frequency signal is converted into terms of speed. This is usually termed Doppler radar. As applied to the measurement of vehicular speed, the radio beam is usually directed slantwise toward the approaching traffic; thus vehicles travelling along the traffic lane traverse the radar beam slantwise. The radar responds to reflected signals throughout the travel of the car's length into the beam, through the beam and out of the beam.

The vehicle speed recording apparatus disclosed herein is arranged so that the Doppler radar actuating portion thereof responds to speeds above any arbitrary limit and includes means for tripping a camera to provide photographic evidence of the speeding vehicle. The present apparatus discloses means for controlling a camera by Doppler radar in such an arrangement as to preclude the possibility of false evidence of speeding. This is achieved by the utilization of a Doppler radar whose response range is limited to the area of the photographic field of the camera employed. It will occur to those skilled in the art that several Doppler radar circuits may be employed for the purpose and the invention herein disclosed therefor lies in the combination of the radar, the camera for recording the evidence of the speeding vehicle, the actuation of the camera by the radar acutated apparatus and the illumination of the vehicle as also controlled by the radar actuated apparatus simultaneously with the camera. Additionally, the present invention incorporates speed indicating means such as a speedometer arranged in conjunction with the camera so that when the enforcement vehicle is moving the same apparatus may be employed for photographing a traffic violator together with the indicia of the speedometer of the enforcement vehicle rather than the information supplied by the radar. The apparatus disclosed herein thus possesses the unique advantage of being capable of being used for the radar surveillance and control of traffic violators from either stationary or a moving enforcement vehicle.

With the foregoing and other objects in view which will appear as the description proceeds, the invention resides in the combination and arrangement of parts and in the details of construction hereinafter described and claimed, it being the intention to cover all changes and modifications of the example of the invention herein chosen for purposes of the disclosure, which do not constitute departures from the spirit and scope of the invention.

The invention is illustrated in the accompanying drawing, wherein.

Figure 1:
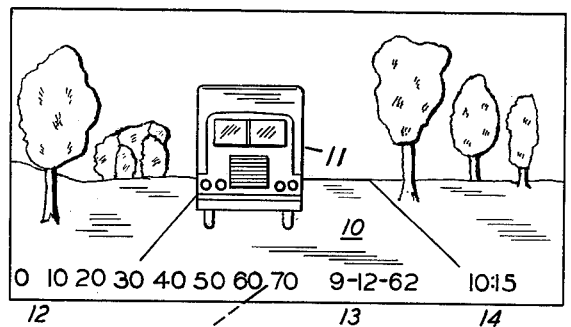
FIGURE 1 is a reproduction of a photograph produced by the apparatus disclosed herein.

By referring to the drawings and FIGURE 1 in particular, it will be observed that the same comprises a reproduction of a photograph showing a highway 10, a vehicle 11 approaching on the highway 10, a speedometer means 12, a date means 13, and a time indicating means 14. The reproduction of the photograph of FIGURE 1 comprises the photographic evidence produced by the apparatus of the invention.

Figure 2:
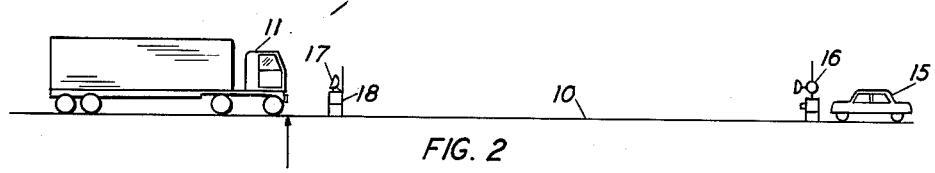
FIGURE 2 is a symbolic illustration of a section of highway showing a traffic violator and the apparatus of the invention arranged for stationary operation with radar control of the speed indicating means and radio control of remote illuminating means.

By referring to FIGURE 2, a schematic diagram illustrates the stationary operation of the device wherein the vehicle 11 is seen on the highway 10 and an enforcement vehicle 15 is parked adjacent the highway 10 and the apparatus of the invention normally located within the enforcement vehicle 15 is symbolically illustrated adjacent thereto and generally indicated by the numeral 16. The diagram of FIGURE 2 also illustrates an illuminating means 17 and a radio controlled power source 18 therefor.

In operation in stationary position as illustrated in FIGURE 2, the enforcement vehicle 15 serves merely as a platform and power source for the radar and camera portion of the apparatus herein disclosed with the radar arranged so that it is responsive only to speeds above a pre-established limit and so that its effective width is limited to the normal separation between vehicles travelling at the speed limit for which the apparatus is adjusted and additionally so that the Doppler beat frequency energy in the apparatus achieves a maximum at a point on the highway 10 corresponding with the position of the vehicle 11. It will be obvious that the source of illumination 17 will be positioned adjacent this particular point of maximum efficiency and that the camera in the apparatus will be focused at this same point so that the apparatus will operate to produce the photographic evidence as typified by FIGURE 1 of the drawings when triggered by a speeding vehicle.

Figure 3:
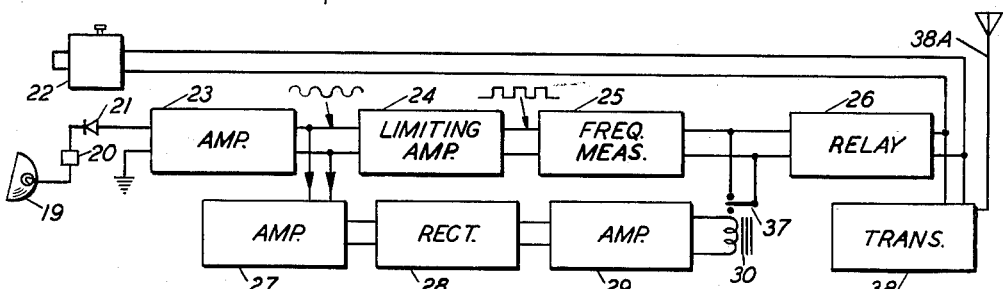
FIGURE 3 is a combined block and circuit diagram of an embodiment of the invention.

By referring now to FIGURE 3 of the drawings, a narrow beam directional antenna 19 is illustrated directed as shown in FIGURE 2 toward a predetermined point on the highway 10. The antenna 19 in operation radiates micro-wave energy and will pick up and respond to reflected energy over a wide range of levels, the mixed generated and reflected signals will produce Doppler beat-frequency energy in the apparatus. Sufficient energy is realized throughout the predetermined distance along the highway 10 as illustrated in FIGURE 2 to actuate the apparatus. The antenna 19 is operatively connected with a micro-wave source of energy 20 which can be a continuous wave klystron oscillator. Reflections from an object in the field of the antenna 19 are collected thereby and suitably coupled to a silicon crystal detector 21 or the like. A directional coupler may be used to prevent the full intensity of the klystron oscillations from reaching the detector 21. A beat between the transmitted and the reflected signal will be produced when the reflecting object travels toward the antenna 19 assuming the antenna to be stationary as illustrated in FIGURE 2 of the drawings. The relative speed can be translated directly from the Doppler frequency where the object travels toward the antenna 19 as the speed corresponding to a given beat frequency can be computed. A computer such as known in the art and commonly used in Doppler effect radars is employed so that the computed speed appears on a dial such as 12 as in the representation of the photograph comprising FIGURE 1 and which dial 12 is incorporated in a combination camera and speed, date and time indicating device as generally illustrated in FIGURE 3 and indicated by the numeral 22.

The Doppler signal delivered from the detector 21 is usually an audio frequency signal and may be applied to an amplifier 23 and in turn to a limiting amplifier 24, then to a frequency measuring circuit 25 and to a utilization device which may comprise a relay 26 or similar mechanism for actuating the camera 22 and the illuminating device 17. It will be observed that the camera 22 is trained on the referred to point on the highway where the radar beam is most effective.

Figure 4:
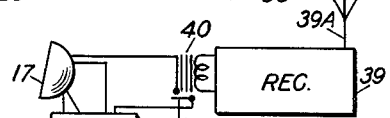
FIGURE 4 is a combined block and circuit diagram of the remotely controlled illuminating device which is used with the invention.

Referring again to FIGURE 3 of the drawings, it will be understood by those skilled in the art that the Doppler beat frequency signal at detector 21 is very greatly amplified and limited so that the frequency measuring unit 25 will not be amplitude-sensitive but will only respond to the frequency of the Doppler signal. As a result, relay 26 would initially operate and would remain closed throughout a very long distance along the area of the highway 10 scanned by the radar antenna 19. Such a result would be virtually useless for the automatic control of the camera 22 to photograph a vehicle travelling at an excessive speed along said highway and wherein the photographic image of the vehicle is to be used as evidence. In order to restrict the range along the highway in which the system is to be effective, a threshold limiter is provided, including an amplifier 27 coupled to the input signal source, conveniently to the output of amplifier 23 as illustrated. The output of amplifier 27 is rectified in a rectifier 28 and the direct-current control output amplified in an amplifier 29 and used in a relay 30 having contacts 37 to disable the system at all times when the signal level is below a predetermined minimum. When the signal level rises above the predetermined minimum contacts 37 open and permit the signal from the frequency measuring unit 25 to be coupled to the relay 26. The relay 26 is coupled to a transmitter 38 and to the camera 22 as hereinafter described. The transmitter 38 is a conventional radio frequency transmitter utilizing an authorized wave length to which a receiver 39 as illustrated in FIGURE 4 is tuned. The receiver 39 comprises the actuating device 18 of the illuminating source 17 in FIGURE 2 and as seen in FIGURE 4 the receiver 39 includes an amplifier which in turn actuates a relay 40 having contacts 41 controlling the illuminating source with respect to its power means.

In operation, the actuating signal from the radar reaches and rises above the minimum required during the travel of a vehicle along the highway 10 in the supervised area as hereinbefore described only while at least part of the vehicle is in said area and therefore within focus of the camera 22. Those skilled in the art will recognize that the range can be made quite small. The amplifier 29 may be and preferably is a vacuum tube biased to cut off or biased to a current far too low to operate the relay 30 so that it is certain that the vehicle which actuated the system is identified as the same vehicle that later appears in the developed photograph. The possibility that the camera might photograph a slow moving vehicle under control of a speeding vehicle is avoided and while the energy in the radar beam might actually be spread over a wide angle, the operation of the relay 26 is limited to a small range in the predetermined area on the highway 10. The frequency measuring unit 25 employed with the limiting amplifier 24 is important in achieving the result of virtual elimination of spurious signals. The limiting amplifier 24 is operated at a constant output voltage for Doppler signals of a certain minimum input level and therefore may include a fixed bias clipper as known in the art.

Figure 5:
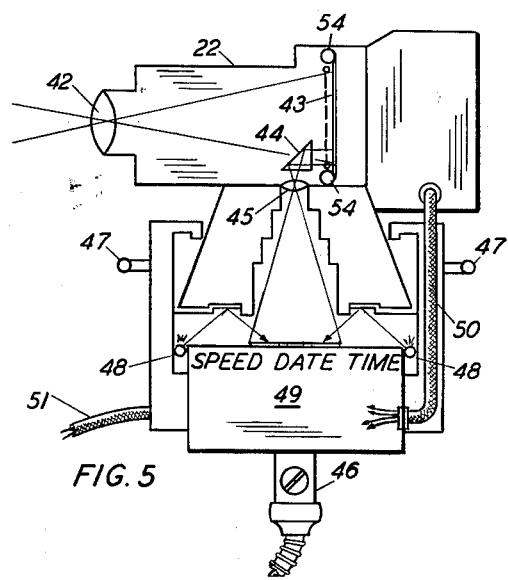
FIGURE 5 is an enlarged section of the camera and speed, time and date indicating apparatus associated therewith.
Figure 6:
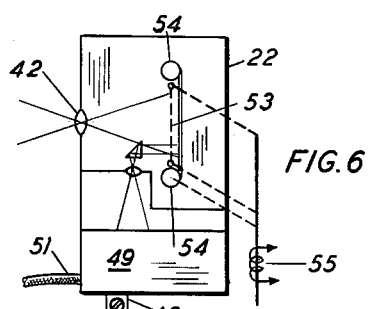
FIGURE 6 is a combined block and circuit diagram of the camera apparatus shown in the diagram of FIGURE 3.

It will occur to those skilled in the art that the Doppler signal delivered from the amplifier 23 is conventional. The limiting amplifier 24 acts to produce a square-shaped output which eliminates the higher and lower frequency constituents of the input signals as such or of small amplitude relative to the main Doppler signal. The frequency measuring unit 25 employed in connection with this limiting amplifier 24 provides a direct current output which is directly coupled to the relay 26 which may be of any type having known characteristics capable of energizing the camera tripping solenoid hereinafter described in the camera unit 22 as well as the illumination controlling solenoid 40 hereinbefore referred to. By referring now to FIGURE 5, a camera such as represented at 22 in FIGURE 2 of the drawings is shown in enlarged symbolic detail and includes the camera body 22, a lens 42, focal plane on film 43, and a prism 44 interposed in the area between the lens 42 and the focal film 43. Film carriers and advancing means of a conventional nature are employed and are illustrated symbolically in FIGURE 6. In FIGURE 5 a secondary lens 45 focused on the prism 44 is arranged to convey the images of the speedometer date and time apparatus, the speed indicating portion of which is operated either by the radar circuitry as set forth in FIGURE 3 of the drawings or by a conventional speedometer, the driving cable of which is indicated by the numeral 46. The camera housing 22 includes a base portion having oppositely disposed mounts 47, 47 by which the device may be mounted in an adjustable manner in the enforcement vehicle and illumination means comprising indirect lights 48 are incorporated so that the speed, time and date indicia of the radar-speedometer responsive unit 49 which is attached to the camera housing 22 may be suitably illuminated.

The various portions of the radar circuitry as set forth in FIGURE 3 diagrammatically are incorporated in the rearmost portion of the housing 22 and/or in the speedometer date and time section 49 thereof and a suitable interconnecting cable 50 is symbolically illustrated as is a power supply cable 51. By referring now to FIGURE 6 of the drawings the camera unit 22 will be seen to be illustrated symbolically and wherein the lens 42 is focused on the film 43 in the camera 22. A focal plane shutter 53 is positioned therebetween. The film 43 is stretched between reels 54, 54 and the arrangement is such that the actuation of the relay 26 actuates a camera actuating solenoid 55 to move the focal plane shutter 53 and advance the film 43. The relay 26 simultaneously actuates the radio frequency transmitter 38 and its control signal broadcast by its antenna 38A and is picked up by the receiver 39 and its antenna 39A to actuate the relay 40 which controls the power source of the illumination means 17 heretofore referred to and illustrated in FIGURE 2. Thus when the apparatus is operating from a stationary position as seen in FIGURE 2 the foregoing description applies.

At such time as the apparatus is in motion in the enforcement vehicle 15 as in trailing a traffic violator then the radar circuitry is deenergized and the data supplied the speed indicating dial in the unit 49 of the camera 22 comes from a speedometer incorporated therein connected with the drive shaft of the enforcement vehicle as will be understood by those skilled in the art. The camera 22 is then operated by manual control thereof or of the relay 26 or by direct energization of the camera actuating solenoid 55 as will occur to those skilled in the art whereupon a photograph of a traffic violator taken from a moving following enforcement vehicle is produced. The apparatus of the invention therefore accomplishes the dual purpose of providing an effective radar controlled camera and supplemental illumination means for photographing a traffic violator together with indicia of speed, date, etc., and the same apparatus provides means in the enforcement vehicle for photographing a moving traffic violator from a following moving enforcement vehicle.

It will thus be seen that the apparatus disclosed herein meets the several objects of the invention, and having thus described my invention what I claim is:

1. A vehicle speed recording apparatus comprising a Doppler effect radar speed detecting system including a frequency measuring device whose time constant is of the same order of magnitude as the period of the Doppler signal of minimum frequency to which the system is to respond, and means actuated by said system for visually indicating said miles per hour, a camera having automatic film advance and shutter controlling mechanisms, means in said camera focusing the said means for visually indicating said miles per hour on a portion of the film in said camera and a relay operated mechanism for actuating the shutter of said camera and advancing said film in said camera responsive in operation to said frequency measuring device, and secondary means in said camera for actuating said means for visually indicating miles per hour, said secondary means comprising a speedometer, a radio frequency transmitter responsive in operation to said frequency measuring device, a separate radio frequency receiver and a source of illumination controlled by said receiver, said source of illumination responsive in operation to said radio frequency receiver.

2. A radio detection and ranging system having a transmitter, receiver and object indentifying device and including a directional antenna, said transmitter and receiver being effective to produce Doppler signals of sufficient strength for normal response at the object identifying device, and a threshold limiting device adapted to produce a variable amplitude, signal, a mixer for combining transmitted and reflected signal components to produce the Doppler signal, and means responsive to certain Doppler signal frequencies and controlled by said threshold limiting device to actuate said object identifying device to identify the object passing through the antenna beam, a camera having automatic film advancing and shutter controlling mechanisms and means in said camera controlling said film advancing and shutter controlling mechanisms responsive in operation to said means responsive to certain Doppler signal frequencies, visual speed indicating indicia means adjacent said camera responsive in operation to said object identifying device and means in said camera for focusing said visual speed indicating means on a portion for said film in said camera, a radio frequency transmitter responsive in operation to said certain Doppler signal frequencies, a separate radio frequency receiver and a source of illumination controlled by said receiver, said source of illumination being responsive in operation to said radio frequency receiver.

3. The radio detection and ranging system set forth in claim 2 and wherein said visual speed indicating indicia means comprises a device incorporating a speedometer and switch means for selectively connecting said visual speed indicating indicia means to speedometer and said object identifying device.

References Cited by the Examiner

UNITED STATES PATENTS 2,683,071  7/54  Pearle _____ 346—107
2,785,395  3/57  Platzman _____ 343—8

CHESTER L. JUSTUS, *Primary Examiner.*